March 18, 1969  G. FRICK  3,434,055
A.C. BRIDGE CIRCUIT FOR DETERMINING THE OPTIMUM OPERATING
CONDITION OF A D.C. GENERATOR
Filed Nov. 27, 1962  Sheet 1 of 3

INVENTOR.
GERMAN FRICK
BY
AGENT

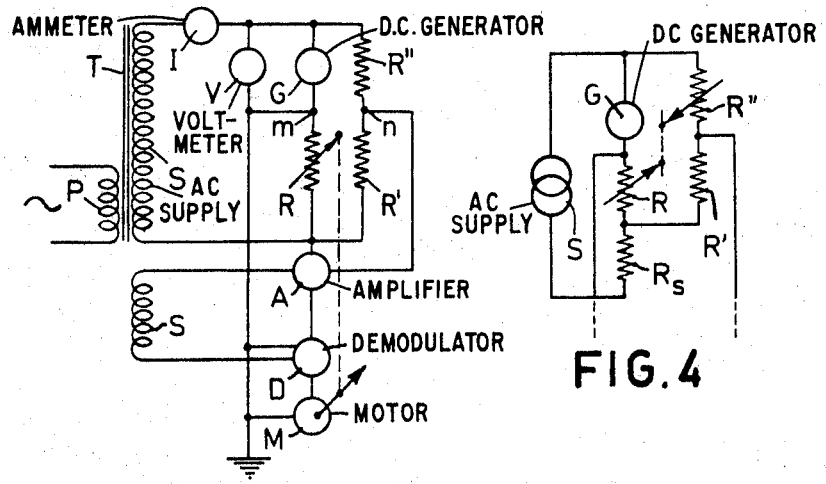
FIG.3
FIG.4
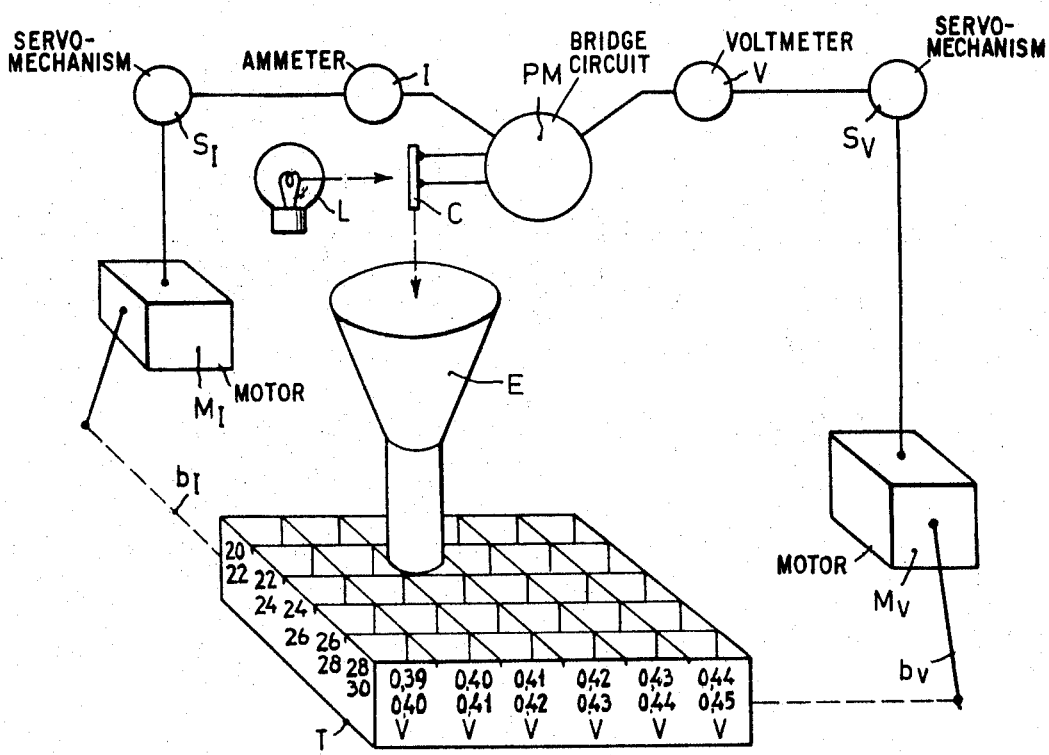
FIG.5

United States Patent Office

3,434,055
Patented Mar. 18, 1969

3,434,055
A.C. BRIDGE CIRCUIT FOR DETERMINING THE OPTIMUM OPERATING CONDITION OF A D.C. GENERATOR
German Frick, Antofagasta, Chile, assignor to North American Philips Company, Inc., New York, N.Y., a corporation of Delaware
Filed Nov. 27, 1962, Ser. No. 240,339
Claims priority, application France, Nov. 27, 1961, 880,108
U.S. Cl. 324—158    12 Claims
Int. Cl. G01r 17/10, 31/22

ABSTRACT OF THE DISCLOSURE

An apparatus for determining the operating point of maximum efficiency of a direct current generator connected in one branch of an A.C. energized bridge circuit. The other branch of the bridge circuit includes impedance elements having a predetermined impedance ratio such that the direct current generator operates at its point of maximum efficiency in the balanced condition of the bridge.

---

The present invention relates to a control device for direct current generators by means of which the operating point of the said generators corresponding to the maximum efficiency can be determined. The control device may also be used for automatically matching the D.C. generator to a load in order that the generator efficiency is maximum during operation. Such a device may be used subsequent to a manufacturing process for control, testing or grading purposes, or during the manufacturing process for determining the duration of a manufacturing operation of which the efficiency of the generator is a function.

The industrial testing of the power of certain new static devices which serve for producing an electric direct current voltage requires the determination of the operating point of the device which corresponds to the maximum efficiency. When using conventional methods, this operation can be performed only after a number of experiments. Under these conditions the testing for a manufacture on an industrial scale is difficult to observe.

The invention solves this problem in a very simple and very rapid manner.

The control device according to the invention comprises a resistance measuring bridge having a pair of input terminals to which is supplied a source of alternating current. The direct current generator to be tested and a variable resistor forming its load resistance constitute the two first series branches of the bridge. The two other branches of the bridge are proportioned so that when the bridge is balanced the maximum power of the DC generator is obtained. A servo-mechanism is coupled to the other pairs of terminals of the said bridge so as to vary the resistance value of the variable resistor automatically to bring the bridge into balance.

If one observes the current-voltage characteristic, $i$ against $v$ (FIGURE 1), of a direct current generator which is connected in series with a variable load resistor R to the terminals of an alternating voltage source S having a negligible internal resistance (FIGURE 2), it is readily seen that: (1) the characteristic has only one point for which the power, and therefore the efficiency, is maximum (M), (2) if the voltage of the source S is zero, it holds that $V_G = -V_R$ or $V_G + V_R = 0$, (3) if the source S has an electromotive force $V_S$ in the circuit, a current modulation is obtained such that $$V'_R + V'_G + V_S = 0$$

in which formula $V'_R - V_R$ and $V'_G - V_G$ are the voltage differences which occur at the terminals of the DC generator and of the variable resistor by the introduction of AC voltage source $V_S$.

If the load resistance is controlled so that the direct current generator is at its operating point corresponding to maximum efficiency, the dynamic resistances of the generator and of the load resistance are equal and consequently the absolute values of the voltage differences $V'_R - V_R$ and $V'_G - V_G$ are equal. Consequently, by introducing the D.C. generator and a variable load resistor into the two first series branches of a measuring bridge, where the two other branches are identical, the bridge is balanced if the generator is at its operating point corresponding to maximum efficiency.

It has been assumed above that the internal resistance of the alternating current source is negligible compared with the sum of the resistances of the circuit through which direct current is flowing (dynamic resistance of the generator plus load resistance at point of the maximum efficiency). If the internal resistance of the A.C. source is not negligible, means must be provided for compensating the unbalance introduced.

According to a further feature of the invention, the value of one of the resistors which constitute one of the two series branches of the bridge, which resistor is provided in the branch opposite to the direct current generator and its variable load resistor, is also influenced by mechanical coupling with the latter. Its range is determined so that the balance of the measuring bridge is reached if the value of the total resistance connected in series with the direct current generator (namely the variable load resistance plus the internal resistance of the alternating current source) equals the value of the load resistance corresponding to the operating point of maximum efficiency.

In other words, if the internal resistance of the alternating current source and the D.C. generator are equal to $R_s$ and $R_g$, respectively, and R is the value of the variable load resistor, the values of the resistors $R'$ and $R''$ (see FIG. 4), which constitute the two series branches of the bridge which are provided opposite to the direct current generator and the variable load resistor, must satisfy the following formula to produce a balance of the bridge:

$$\frac{R''}{R'} = \frac{R_g}{R}$$

However, if $R_s$ is small compared with the resistance of the branch comprising $R'$ and $R''$, then for maximum efficiency, $R_g = R + R_s$. Substituting $R + R_s$ for $R_g$ in the first formula above results in:

$$\frac{R''}{R'} = \frac{R + R_s}{R}$$

(see FIGURE 4 and the explanations below) so that $$R'' = R'\left(1 + \frac{R_s}{R}\right)$$

So it is found that $R''$ may depend upon R.

As already stated above, the testing device according to the invention may be used for grading the D.C. generators at the completion of the manufacture process.

According to a further feature of the invention, the same number of measuring devices are provided in the automatic measuring bridge as the required number of grading criteria. In this case, each measuring device is connected to a servo-mechanism which drives a perforated block to a particular position such that, if the measuring bridge is in balance, a direct current generator is detached and guided to a hole which corresponds to the operating point determined by the measuring device.

As already stated, the testing device may also be used during the manufacture of a direct current generator to determine the duration of an operation of which the efficiency of the generator is a function. In this case it is required first to determine the average operating point for which an optimum efficiency is to be obtained. In this case the direct current generator is introduced into the automatic measuring bridge at the beginning of the above operation.

According to a further feature of the invention, the measuring device which indicates the operating point of the direct current generator during the manufacture is connected to a control device (for example, a relay) which causes, by suitable means, the operation to be terminated if the measuring device provides an indication which corresponds to the previously determined average opearting point.

By direct current generators are to be understood also, for example, thermoelectric elements or photoelectric cells, and so on.

In the case of photoelectric cells, as for example described in French Patent Specification 1,276,723 of Oct. 11, 1960, the efficiency of a cell is a function of the duration of an etching treatment which may be checked by a testing device according to the invention.

According to a further feature of the invention, the automatic measuring bridge, one of the branches of which comprises a photoelectric cell dipped in an etching bath, is connected to a measuring device which is connected to a relay for starting a motor. The apparatus further comprises a driving rod which slides in a bearing and a stop member at the end of the path.. If the measuring device indicates the previously determined operating point corresponding to a maximum efficiency, the energisation of the relay controls the starting of the motor which, as a result of the cooperation of its wheels, begins half a rotation so that the photoelectric cell, mounted on an extension of the driving rod which is bent at right angles, leaves the etching bath and is dipped in a neutralizing bath located in the same plane.

In order that the invention may readily be carried into effect, it will now be described more fully, by way of example, with reference to the accompanying drawing, in which:

FIGURES 1 and 2 diagrammatically show the operation of the above device;

FIGURE 3 is a diagramamtic circuit of the automatic measuring bridge;

FIGURE 4 shows part of the automatic measuring bridge which may be connected to an alternating current source having a non-negligible internal resistance;

Figure 1:
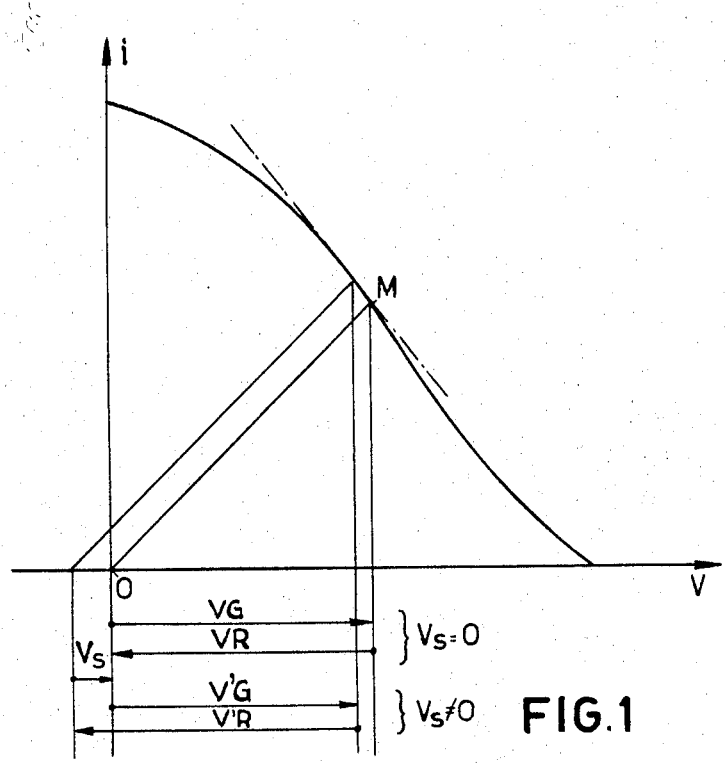
Figure 2:
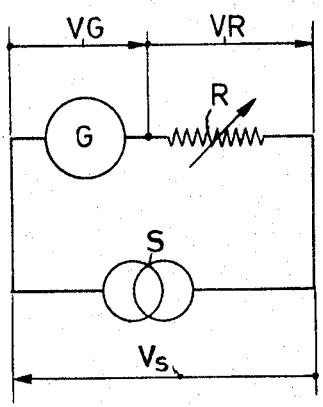
Figure 6:
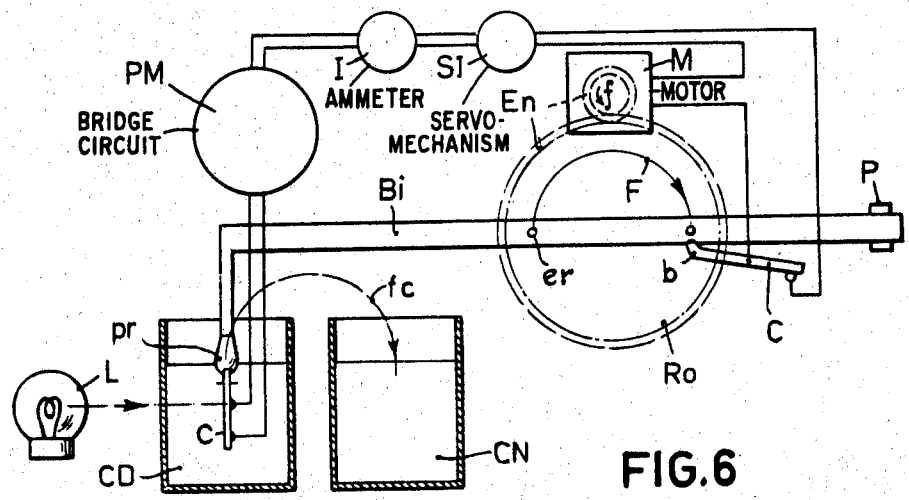
Figure 7:
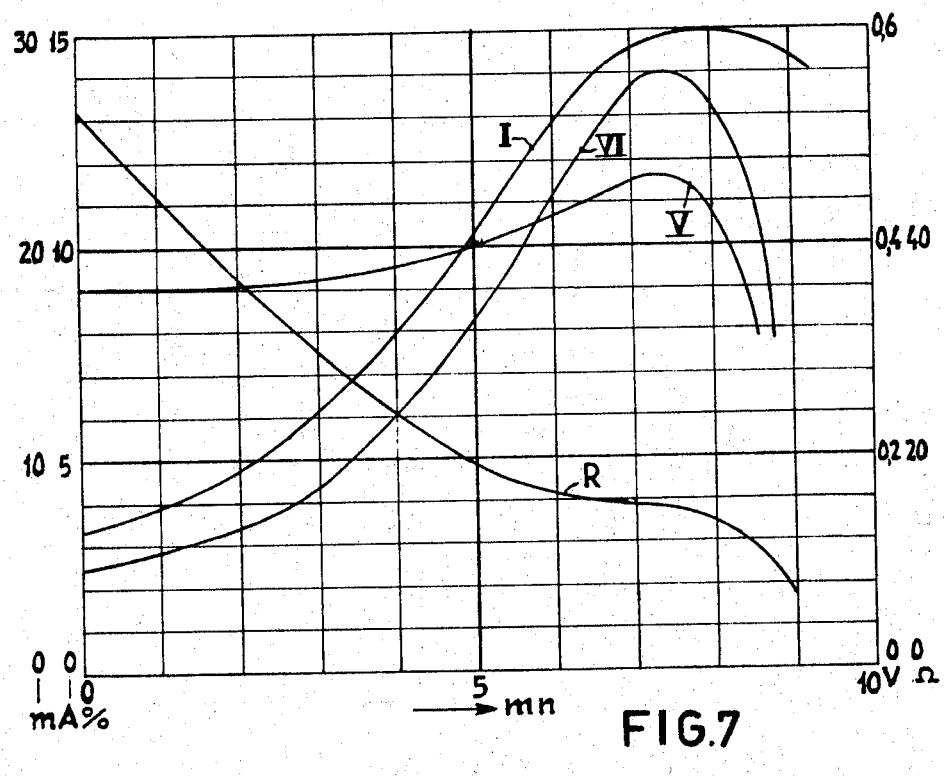

FIGURE 5 diagrammatically shows an apparatus which uses the automatic measuring bridge for grading photoelectric cells;

FIGURE 6 diagramamtically shows a device which uses the automatic measuring bridge during the manufacture of photoelectric cells; and FIGURE 7 shows a few curves to explain the operation of the device shown in FIGURE 6.

FIGURE 3 shows the resistance measuring bridge proper which is energized from one of the secondary windings S of a transformer T, the primary of which is connected to an alternating current source. The direct current generator G is connected in series with the variable resistor R, which forms its load resistance, to the terminals of the secondary winding S and constitutes the two first series branches of the bridge. The two other series branches are constituted by the resistors R" and R' which are equal in value. Between the junction points of the direct current generator G and the variable resistor R on the one end, and of the two resistors R" and R' on the other end, a control sytem is provided which consists of an amplifier A, a synchronous demodulator D to which is supplied, with the interconnection of the secondary S, a signal of a phase equal to that which is supplied to the resistance measuring bridge, and a motor M which is coupled to the control device for varying the variable resistor R. Two measuring apparatus I and V are connected in the measuring bridge, one of them measures the current I and the other measures the voltage difference V. The values of I and V establish the operating point of the generator G.

So long as the bridge is unbalanced, that is to say so long as the alternating voltage differences at the terminals of the generator G and and at the variable resistor R are not equal to one another, a signal is obtained between the points $m$ and $n$ which is amplified by the stage A and demodulated in the circuit D. The output signal of demodulator D controls the rotation of the motor M in the desired direction, said motor taking along the sliding contact of the variable resistor R.

It is evident that the resistors R' and R" may be omitted if the winding S of the transformer T is provided with a center tapping. In this case, the amplifier A is connected to the center tapping instead of to the point $n$.

By using a resistance bridge and a synchronous demodulating system, errors may be removed from the measurement which are due to phase shifts introduced by the reactive components of the circuit equivalent to the generator.

If the resistor R is controlled so as to equal the dynamic resistance of the generator G, that is to say if the efficiency is maximum, the signal obtained between the terminals $m$ and $n$ reduces to zero and the automatic measuring bridge is stationary. By reading the indications supplied by the measuring apparatus I and V, the operating point is characterized which corresponds to the maximum efficiency of the generator G.

FIGURE 4 shows a variation of the measuring bridge in which the internal resistance of the source S, for example, $R_S$ is not to be neglected with respect to the sum of the resistances of the circuit through which the direct current is flowing (for example, 2R at the point of the optimum efficiency). As already explained above, in this case, for example, one of the fixed resistors R" is made variable by coupling its sliding contact to the sliding contact of the variable resistor R.

In this case, it is necessary that at the point of optimum efficiency the ratio of the values R" and R' equals the ratio of the values $R+R_S$ (corresponding to the generator and to the internal resistance of the source) and R, in a manner such that at the point of balance the total resistance in series with the D.C. generator is exactly equal to the optimum load resistance, so $$\frac{R''}{R'}=\frac{R+R_S}{R}$$

and the variation of R" depends upon the variation of R in accordance with the formula:

$$R''=R'\left(1+\frac{R_S}{R}\right)$$

FIGURE 5 shows an apparatus which uses the automatic measuring bridge for grading photoelectric cells.

In this case the cells C to be graded are introduced into the automatic measuring bridge PM. Their operating points corresponding to the maximum efficiency are determined by the automatic measuring bridge under a normal illumination, for example, of 0.1 watt/cm.$^2$ supplied by the lamp L.

The automatic measuring bridge is connected to two measuring apparatus I and V, of which one determines the current flowing in the cell and the other determines the voltage at its terminals. In the example of FIGURE 5 it has been assumed that the cells are graded in accordance with five possible values of I between the limits: 20–22 ma., 22–24 ma., 24–26 ma., 26–28 ma., 28–30 ma., and in accordance with six values of V between the limits: 0.39–0.40 v., 0.40–0.41 v., 0.41–0.42 v., 0.42–0.43 v., 0.43–0.44 v., 0.44–0.45 v.

For this grading a drawer is used having thirty holes, the longitudinal and transverse movements of which are controlled by two motors MV and MI.

The measuring apparatus I and V are connected to two servo-mechanisms SI and SV which control the motors MI and MV in a manner such that, if the automatic measuring bridge is balanced, a relay provided in each servo-mechanism starts the associated motor. The rotation of this motor depends upon the indication supplied by the measuring apparatus and causes the movement of the drawer by a system of rods BI and BV.

If the assembly is stationary, the hole which corresponds to the operating points, which are determined by the measurement of I and V, is located opposite to a funnel E into which the tested cell falls after detaching.

FIGURE 6 diagrammatically shows the apparatus used for testing the manufacture of photoelectric cells during the etching treatment as described in the above French patent specification.

According to the method described in this patent specification, a layer of the n-type material of from 4–5 microns thick is provided on the surface of the photoelectric cell by diffusion of phosphor in silicon P. The thickness is larger than that with which the maximum efficiency is obtained. In order to bring this thickness to the optimum value, a slow chemical etching treatment is performed while the progress is checked by measuring the photoelectric properties of the cell. For this purpose the cell is dipped in a bath (HF:99%, $HNO_3$) and illuminated by the lamp L. The cell is provided in an automatic measuring bridge PM as described above, and said bridge is connected to a measuring apparatus of intensity I. This measuring apparatus controls a servo-mechanism SI when the indication supplied by it reaches a previously determined value.

FIGURE 7 shows the variation of the characteristics of the cell during the etching treatment. The relative curves are plotted in a system of coordinates in which the abscissa represents the etching time in minutes. The ordinate represents for curves I, VI, V and R the current in ma., the efficiency in percent, the voltage in volts and the resistance in ohms, respectively.

At the beginning of the operation, the cell which is subjected to an illumination corresponding to 0.1 watt/$cm.^2$ supplies at the point of maximum efficiency a voltage difference of approximately 0.36 v. and a current of the order of magnitude of 7 ma./$cm.^2$ of surface (yield 2.5%). As the thickness of the diffused layer decreases, the characteristics of the cell vary in accordance with FIGURE 7. From this figure it may be seen that the maximum efficiency (curve VI) passes through a value of approximately 14%. For this value there is a comparatively small variation in current from cell to cell. However, it is readily seen that the current I varies comparatively rapidly with the etching time. The average value of this current may be determined by preliminary experiments (approximately 29 ma.) and it may be decided that the etching is discontinued automatically by the testing system whenever the current I reaches the average value so chosen. In that case the servo-mechanism $S_I$ controls, for example, the starting of a motor M which takes along a mechanism by which the cell leaves the etching bath and is immediately dipped in a second bath which contains pure water or water containing a slight quantity of reagent and which neutralizes the action of the etching bath. Of course, the termination of the etching might also be controlled by one of the three other parameters VI, V or R, which are also determined automatically.

The mechanism connected to the motor comprises a system of wheels En of which one of the wheels Ro is connected rigidly to a driving rod Bi in the direction of its horizontal axis. During the rotation of the wheel Ro this rod slides in a bearing P. The part of the rod remote from the bearing P is bent at right angles and comprises at its end a tong Pr with which the cell C is held in a container with etching agent. As soon as the measuring apparatus I supplies the indication which corresponds to the previously determined value of intensity, the motor M rotates in the direction of the arrow f and the wheel Ro rotates in the direction of the arrow F so as to arrest the motor when the wheel Ro has performed half a rotation. The motor is stopped by means of servo-mechanism SI which is under the control of a contact c, which determines the end of the path. This contact comprises a stop b which touches a pin when the wheel Ro has performed half a rotation.

During this half-rotation, the cell C is consequently lifted out of the container with etching medium CD, moved in the direction of the arrow fc, then dipped in a neutralizing bath in the container CN. The two containers CD and CN are located at a distance from each other corresponding to the horizontal movement of the rod Bi.

I claim:

1. Measuring apparatus for a direct current generator of the type that converts nonelectric energy into direct current electric energy comprising, a bridge circuit having input and output terminals and including first and second branches connected in parallel between said input terminals, said first branch comprising said direct current generator and a variable impendance load element therefor connected in series, said second branch comprising first and sceond impedance elements connected in series, said first and second impedance elements having predetermined values of impedance in a given ratio such that said direct current generator operates at its point of maximum efficiency in the balanced condition of the bridge circuit, a source of alternating current coupled to said input terminals, and means coupled to said output terminals and responsive to a control signal produced thereat for varying the impedance of said variable impedance element so as to bring said bridge circuit into a balanced condition at said operating point of maximum efficiency of the generator.

2. Apparatus for determining the operating point of maximum efficiency of a direct current generator of the type that converts non-electric energy into direct current electric energy and wherein a given electrical parameter of said generator varies during the measuring interval, comprising a self-balancing bridge circuit having input and output terminals and comprising first and second branches, a source of alternating current coupled to said input terminals, said first bridge circuit branch comprising said direct current generator and a variable impedance load element in series in adjoining arms thereof, said second branch comprising first and second impedance elements in adjoining arms thereof, said first and second impedance elements having fixed values of impedance in a given ratio that is determinative of the point of maximum efficiency of said generator, and means coupled to said output terminals and responsive to a signal produced thereat for adjusting the impedance of said variable imepdance element to maintain said bridge circuit in a condition of balance during said measuring interval, thereby to operate said direct current generator at said point of maximum efficiency.

3. Apparatus for determining the operating point of maximum efficiency of a direct current generator of the type that converts non-electric energy into direct current electric energy, comprising first nad second branches, a source of alternating current coupled to said input terminals, said first bridge circuit branch comprising said direct current generator in one arm thereof and a variable resistance element in the other arm thereof and forming a load for said direct current generator, said second branch comprising first and second resistance elements in adjoining arms thereof, said bridge circuit producing a control signal at said output terminals, and means coupled to said output terminals and responsive to said signal for varying the resistance of said variable resistance element to bring said bridge circuit to a condition of balance, said first and second resistance elements having values of resistance in a given ratio so that in said balanced bridge condition the maximum efficiency of said DC generator is obtained as a function of the resistance value of said variable resistance element.

4. Apparatus as described in claim 3, further comprising means coupled to said direct current generator for indicating the operating condition of said direct current generator in the balanced condition of said bridge circuit.

5. Apparatus as described in claim 3, further comprising means for measuring direct currents connected in series circuit with said direct current generator and means for measuring direct current voltages connected in parallel with said direct current generator.

6. Apparatus as described in claim 3 wherein said generator comprises a photoelectric transducer, said apparatus further comprising means for illuminating said photoelectric transducer at a given intensity level.

7. Apparatus as described in claim 3 wherein said first resistance element is variable, and means for coupling said resistance varying means to said first resistance element so that resistance varying means simultaneously varies the resistance of said variable load resistance element and said first resistance element, the elements of said bridge being related in accordance with the following formula:

$$R'' = R' \left(1 + \frac{R_s}{R}\right)$$

wherein R'' and R' are the resistance values of said first and second resistance elements, R is the resistance value of said variable resistance element, and $R_s$ is the internal resistance of said alternating current source.

8. Apparatus for determining the operating point of maximum efficiency of a direct current generator of the type that converts nonelectric energy into direct current electric energy, comprising a source of alternating current, a bridge circuit having input terminals coupled to said alternating current source and output terminals for supplying a control signal, said bridge circuit comprising first and second branches, said first branch including said direct current generator in one arm thereof and a variable resistor in the adjoining arm thereof, said second branch consisting of first and second fixed resistors of substantially equal resistance in the adjoining arms thereof, said alternating current source having an internal resistance which is small compared to the resistance value of each of said first and second branches, and means coupled to said output terminals and responsive to said signal for varying the resistance of said variable resistance element to bring said bridge circuit to a condition of balance thereby to operate said generator at said point of maximum efficiency.

9. Apparatus for determining the operating point of maximum efficiency of power transfer of a direct current generator, comprising a source of alternating current, a bridge circuit having input terminals coupled to said alternating current source and output terminals for supplying a control signal, said bridge circuit comprising first and second branches, said first branch including said direct current generator in one arm thereof and a first variable resistor in the other arm thereof and forming a load for said direct current generator, said second branch including a first resistor in one arm thereof and a second variable resistor in the second branch thereof, said first and second resistors in said other arm having predetermined values of resistance in a given ratio such that said direct current generator operates its point of maximum efficiency in the balanced condition of the bridge circuit, and means coupled to said output terminals and responsive to said signal for varying the resistance of each of said first and second variable resistors to bring said bridge circuit to said condition of balance.

10. Apparatus as described in claim 9, wherein each of said variable resistors comprises a potentiometer having a movable arm and wherein said means for varying comprises a servo system having first input means coupled to said output terminals, second input means coupled to said alternating current source, and mechanical output means coupled to the movable arms of said potentiometers for tracking said arms in response to said control signal.

11. Apparatus for monitoring a manufacturing process for producing a direct current generator of the photoelectric cell type wherein said cell is chemically treated to cause a predetermined electrical parameter of said cell to vary during a measuring interval, comprising a bridge circuit having input and output terminals and first and second branches, a source of alternating current coupled to said input terminals, said first bridge circuit branch comprising said photo-electric cell in one arm thereof and a variable resistance element in the other arm thereof and forming a load for said cell, said second branch comprising first and second resistance elements in adjoining arms thereof which are related in a given ratio determinative of the operating point of maximum efficiency of said cell, means coupled to said output terminals and responsive to a signal produced thereat for adjusting the resistance of said variable resistance element to bring said bridge circuit to said balanced condition during said measuring interval, and means responsive to said varying parameter of said cell for indicating when said point of maximum efficiency of said cell is reached in the manufacturing process.

12. Apparatus as described in claim 11 wherein said chemical treatment of said cell comprises means for subjecting said cell to an etching treatment in a chemical bath and wherein said indicating means further comprises means responsive to said predetermined cell parameter for terminating said etching treatment at a given value thereof indicative of said point of maximum efficiency of the cell.

References Cited

UNITED STATES PATENTS

| | | | |
|---|---|---|---|
| 2,806,193 | 9/1957 | Koppel | 318—29 |
| 2,844,775 | 7/1958 | Miller | 318—29 |
| 2,968,180 | 1/1961 | Schaffer | 324—61 |
| 3,000,385 | 9/1961 | Shay | 134—57 |
| 3,062,223 | 11/1962 | Malin | 134—57 |
| 3,117,899 | 1/1964 | McLouski | 324—158 X |
| 3,128,879 | 4/1964 | Birchall | 209—111.7 |
| 3,137,392 | 6/1964 | Slight | 209—111.7 |
| 3,150,021 | 9/1964 | Sato | 324—158 X |
| 3,182,252 | 5/1965 | Van Den Berg | 324—99 X |

RUDOLPH V. ROLINEC, *Primary Examiner.*

E. L. STOLARUN, *Assistant Examiner.*

U.S. Cl. X.R.

322—80; 318—29; 324—20